(12) United States Patent
Horváth et al.

(10) Patent No.: US 12,293,138 B1
(45) Date of Patent: May 6, 2025

(54) SIMULATION THROUGH A SEQUENCE OF MACROS USING ONE OR MORE REDUCED ORDER MODELS

(71) Applicant: ANSYS, Inc., Canonsburg, PA (US)

(72) Inventors: Géza Árpád Horváth, St. Andrä-Wördern (AT); Sebastian Wolff, Vienna (AT)

(73) Assignee: ANSYS, Inc., Canonsburg, PA (US)

( * ) Notice: Subject to any disclaimer, the term of this patent is extended or adjusted under 35 U.S.C. 154(b) by 902 days.

(21) Appl. No.: 17/199,538

(22) Filed: Mar. 12, 2021

(51) Int. Cl.
*G06F 30/12* (2020.01)
*G06F 30/27* (2020.01)
*G06F 111/20* (2020.01)

(52) U.S. Cl.
CPC .............. *G06F 30/27* (2020.01); *G06F 30/12* (2020.01); *G06F 2111/20* (2020.01)

(58) Field of Classification Search
CPC .......... G06F 30/27; G06F 30/10; G06F 30/12; G06F 30/20; G06F 30/23; G06F 30/367; G06F 30/398; G06F 2111/20
See application file for complete search history.

(56) References Cited

U.S. PATENT DOCUMENTS

| | | | | |
|---|---|---|---|---|
| 5,423,023 A | * | 6/1995 | Batch | G06F 8/70 717/139 |
| 8,745,641 B1 | * | 6/2014 | Coker | G06F 11/3668 719/318 |
| 9,053,260 B2 | * | 6/2015 | Romatier | G05B 17/02 |
| 2015/0278727 A1 | * | 10/2015 | Sankaran | G06Q 10/0633 705/7.27 |
| 2019/0171438 A1 | * | 6/2019 | Franchitti | G06N 3/08 |
| 2019/0370420 A1 | * | 12/2019 | Feng | G06F 30/20 |
| 2020/0042659 A1 | * | 2/2020 | Tallman | G06F 30/23 |
| 2020/0286012 A1 | * | 9/2020 | Yang | G06Q 10/06311 |
| 2020/0349482 A1 | * | 11/2020 | Grossman | G06F 9/4881 |
| 2020/0363856 A1 | | 11/2020 | Kulkarni et al. | |
| 2021/0149784 A1 | * | 5/2021 | Soorya | G06F 9/5077 |

OTHER PUBLICATIONS

Cleary, Paul W., et al. "Workspace: A workflow platform for supporting development and deployment of modelling and simulation." Mathematics and Computers in Simulation 175 (2020): 25-61 (Year: 2020).*

(Continued)

*Primary Examiner* — David A Hopkins
(74) *Attorney, Agent, or Firm* — WOMBLE BOND DICKINSON (US) LLP

(57) ABSTRACT

The disclosed embodiments include a simulation system that guides, through a user interface, a creation of a set of reduced order models (ROMs) with compatible macros to ensure the creation of a set of computations in the simulation is compatible at execution time. The macros can provide a macro based workflow, where the macros evaluate the ROMs in the workflow. The user interface can restrict the set of macros to those that are compatible with a selected set of ROMs. In one embodiment, the set of ROMs can produce a customizable set of outputs using a user defined sequence of ROMs that are associated with corresponding selected macros to simulate a physical system. The set of ROMs and their compatible macros can be encapsulated into a single unit such as a Functional Mock-Up Unit file.

20 Claims, 9 Drawing Sheets

(56) References Cited

OTHER PUBLICATIONS

Hartmann, Dirk, Matthias Herz, and Utz Wever. "Model order reduction a key technology for digital twins." Reduced-Order Modeling (ROM) for Simulation and Optimization: Powerful Algorithms as Key Enablers for Scientific Computing (2018): 167-179. (Year: 2018).*

Tumiati, Simone. A Multidisciplinary Framework for Aircraft Landing Gear Brake Actuation Design. Diss. Politecnico di Torino, 2018. pp. 24, 38-39, and 72 (Year: 2018).*

Stecken, Jannis, Kay Lenkenhoff, and Bernd Kuhlenkötter. "Classification method for an automated linking of models in the co-simulation of production systems." Procedia CIRP 81 (2019): 104-109. Abstract, pp. 106-108 (Year: 2019).*

Santos, Felix CG, Mardoqueu Vieira, and Maria Lencastre. "Workflow for simulators based on finite element method." Computational Science—ICCS 2003: International Conference Melbourne, Australia and St. Petersburg, Russia Jun. 2-4, 2003 Proceedings, Part II 3. Springer Berlin Heidelberg, 2003. (Year: 2003).*

Sansberg, Marcus, et al. "A design tool integrating CAD and virtual manufacturing for distortion assessment." 15th International Conference on Engineering Design, ICED'05. 2005. Abstract, pp. 2-3 (Year: 2005).*

Reimann, Peter, Holger Schwarz, and Bernhard Mitschang. "A pattern approach to conquer the data complexity in simulation workflow design." OTM Confederated International Conferences "On the Move to Meaningful Internet Systems". Berlin, Heidelberg: Springer Berlin Heidelberg, 2014. pp. 21-29 (Year: 2014).*

Rak, Massimiliano, Antonio Cuomo, and Umberto Villano. "Mjades: Concurrent simulation in the cloud." 2012 Sixth International Conference on Complex, Intelligent, and Software Intensive Systems. IEEE, 2012. pp. 856-857 (Year: 2012).*

Alejandro Palacio, Xavier Latorre, Carles Mitjans, Pablo Cruz. "Automation of Cae Pre & Post Processing Activities Using ANSA & μETA Scripting Capabilities". 3rd ANSA & μETA International Conference Sep. 9-11, 2009 Olympic Convention Centre, Porto Carras Grand Resort Hotel, Halkidiki Greece. (Year: 2009).*

Görlach, Katharina, et al. "Conventional workflow technology for scientific simulation." Guide to e-Science: Next Generation Scientific Research and Discovery (2011): 323-352. Abstract, pp. 324, 334-340, 344 (Year: 2011).*

Gomes, Cláudio, et al. "Semantic adaptation for FMI co-simulation with hierarchical simulators." Simulation 95.3 (2019): 241-269. Abstract, pp. 245-250, 254-258 (Year: 2019).*

Gödecke, Andreas, et al. "FEM models in System Simulations using Model Order Reduction and Functional Mockup Interface." 9th International Modelica Conference. Munich, Germany. 2012. Abstract, pp. 565-566 (Year: 2012).*

Galtier, Virginie, et al. "Experimenting with matryoshka co-simulation: Building parallel and hierarchical fmus." 12th International Modelica Conference. 2017. Abstract, pp. 2-8 (Year: 2017).*

Frick, Konor L., Andrea Alfonsi, and Cristian Rabiti. Status Report on IES Plug-and-Play Framework. No. INL/EXT-20-60625-Rev000. Idaho National Lab.(INL), Idaho Falls, ID (United States), 2020. Abstract, pp. 2-8, 16, 20-24 (Year: 2020).*

Faruque, M. O., et al. "Interfacing issues in multi-domain simulation tools." IEEE Transactions on Power Delivery 27.1 (2011): 439-448. Abstract, p. 443 (Year: 2011).*

Duron, Luc, and Yishu Wang. "PyTelTools: Python scripts and GUI to automate Telemac post-processing tasks." Abstract, pp. 43-44 (Year: 2017).*

Cuomo, Antonio, Massimiliano Rak, and Umberto Villano. "Planting parallel program simulation on the cloud." Concurrency and computation: practice and experience 27.6 (2015): 1467-1482. Abstract, pp. 1471-1475 (Year: 2015).*

Chandrasekar, Sureshkumar, and Jesse Gohl. "Development of Custom Workflows for Simulation and Analysis of Functional Mock-up Units." Proceedings of the 10 th International Modelica Conference; Mar. 10-12; 2014; Lund; Sweden. No. 96. Linköping University Electronic Press, 2014. pp. 1265-1267 (Year: 2014).*

Baalbergen, Erik H., et al. "Collaborative engineering technologies enabling multi-partner thermal analysis in early design stages of aircraft." (2016). pp. 14-17, 19-24, 29-33 (Year: 2016).*

Scopatz, Anthony M. "Total Recall: flmake and the Quest for Reproducibility." SciPy. 2012. Abstract, pp. 16-17 (Year: 2012).*

Poinot, Marc, et al. "The Mosaic CGNS Dataflow Platform." AIAA Scitech 2019 Forum. 2019. pp. 8-10. (Year: 2019).*

Neema, Himanshu, et al. "Simulation integration platforms for cyber-physical systems." Proceedings of the Workshop on Design Automation for CPS and IoT. 2019. Abstract, § 5. (Year: 2019).*

Ma, Songhua, and Ling Tian. "A web service-based multi-disciplinary collaborative simulation platform for complicated product development." The International Journal of Advanced Manufacturing Technology 73 (2014): 1033-1047. Abstract, pp. 1033-1034 (Year: 2014).*

* cited by examiner

MATCHING OF COMPATIBLE MACROS　　251
| ROM 1 | ROM 2 | ROM 3 |
|---|---|---|
| MACRO 1 | MACRO 2 | MACRO 1 |
| MACRO 3 | MACRO 4 | MACRO 5 |
| MACRO 5 | | |
FIG. 3B
MACRO (ABSTRACT EXAMPLE)
261 — inputs: x, y, z with units (e.g., pressure, etc) and data types (e.g., integer or floating point or boolean)
263 — outputs: a, b, c with units and data types
FIG. 3C
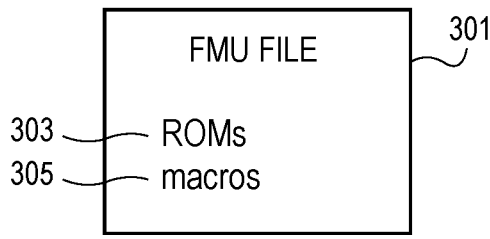
FMU FILE　301
303 — ROMs
305 — macros
FIG. 4A
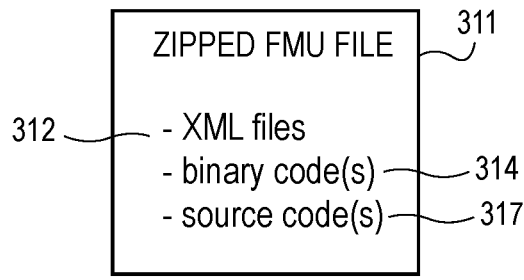
ZIPPED FMU FILE　311
312 — - XML files
- binary code(s) — 314
- source code(s) — 317
FIG. 4B

UI AFTER ROM(s) SELECTED

UI AFTER SELECTION FROM UI 351

UI AFTER SELECTION FROM UI 361

SIMULATION THROUGH A SEQUENCE OF MACROS USING ONE OR MORE REDUCED ORDER MODELS

BACKGROUND

This disclosure relates to the field of the simulation of physical systems by computers used by designers of the physical systems.

The design of physical systems, such as turbines or airplane wings, often includes the use of simulation systems that test the design before it is even manufactured. This testing is done by a simulation system that is typically a computer that executes simulation software, such as multi-physics simulation software. The suite of software from Ansys, Inc. of Canonsburg, Pennsylvania is an example of such software. This simulation software may often use reduced order models (ROMs) that can produce simulation results more efficiently than a full model. A reduced order model can be a trained neural network (e.g. a trained convolutional neural network) that has been trained to provide a solution to a particular physical problem given constraints to the problem. The training can be based on the full model so that the solutions produced by the trained neural network are relatively accurate. However, multidimensional ROMs (such as 3D ROMs) cannot be used in other applications because they use and produce very specific multidimensional data vectors.

SUMMARY OF THE DESCRIPTION

A simulation system in one embodiment guides a user (e.g., a designer) through a user interface that first requires a user to select a set of ROMs and then the system guides the user through a selection of only macros that are compatible with the selected ROMs and that can evaluate and operate with the selected ROMs. Then the system can encapsulate a selected sequence of macros into a single unit, such as a Functional Mock Up (FMU) file having a standard interface, such as the Functional Mock Up interface (based on the standard that is located at fmi-standard.org), to allow a user to generate solutions from the set of ROMs and macros in the single unit. The single unit can be exported and then used by other programs using the standardized interface. The UI also guides the user through the selection of macros and ROMs in the sequence to ensure compatibility thru the stages in the sequence. In one embodiment, the simulation system can automate a workflow that combines a sequence of macros, having specific predetermined data inputs and data outputs with one or more ROMs to provide a simplified way to use the ROMs. The simulation system can be a data processing system that executes a simulation software to perform the embodiments described herein.

A method performed by a simulation system in one embodiment can include the following operations: receiving a selection of a set of one or more reduced order models (ROMs); determining a set of one or more macros, based upon the selected set of one or more ROMs, that are compatible with the selected set of one or more ROMs; displaying in a user interface the determined set of one or more macros; receiving user inputs that select one or more macros to operate with the selected set of one or more ROMs; generating a workflow sequence of the execution of the selected macros and the selected ROMs; and saving the workflow sequence. In one embodiment, the method can further include the operation of: saving the workflow sequence as a single unit in a format, and the single unit can be a computer file in a standardized format specified by a file name extension. This file can be imported for use in other computer programs. In one embodiment, the single unit encapsulates the selected set of macros and the selected set of ROMs (e.g., at least one or more macros and one or more ROMs in an ordered sequence determined by user inputs).

In one embodiment, the user interface limits the available selection of macros to those macros that are compatible with the selected ROMs and the ordered sequence. In one embodiment, compatibility between the selected macros and the selected ROMs is based at least in part on a matching of data fields and data types in outputs from the selected ROMs and inputs from the selected macros. In one embodiment, each macro in the selected macros comprises instructions that represent a set of calculations for predetermined data input types and predetermined data output types. In one embodiment, a macro in the selected macros receives a set of one or more inputs and uses the set of one or more inputs to evaluate an associated ROM in the set of ROMs in order to receive one or more outputs from the associated ROM and then processes the one or more outputs from the associated ROM to produce an output, such as a scalar output. In one embodiment, the selected ROMs provide a set of simulations of a physical system to facilitate design of the physical system. In one embodiment the set of simulations is iteratively performed with a single unit.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 3B an example of the result of matching ROMs with compatible macros.

FIG. 3C shows an abstract example of a macro.

FIG. 4A shows an example of an FMU file with encapsulated macros and ROMs.

FIG. 4B shows an example of a zipped FMU file with encapsulated macros and ROMs; in this case, FIG. 4B shows the different kinds of content such as XML files, binary files and source code files within the zipped (compressed) FMU file.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
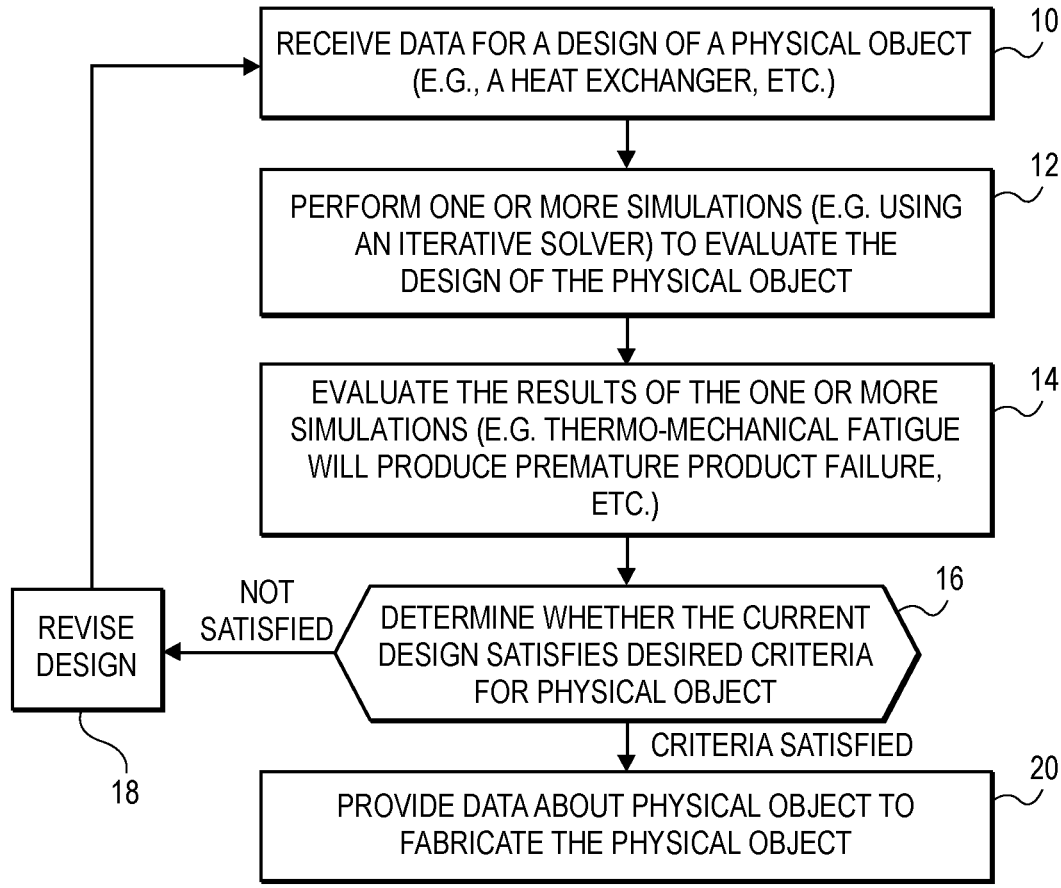
FIG. 1 is a flowchart which illustrates a method which can be used according to one or more embodiments described herein to design and fabricate a physical object, such as a heat exchanger.

The process of designing physical objects, such as heat exchangers, turbochargers, or portions of a jet engine, often involves the use of computer simulations to evaluate the design of the physical object prior to the manufacture or fabrication of the physical object. The simulations allow designers to test out various alternative designs and evaluate them based upon the results of the simulations. These simulations can include different simulations using different models of the physics (e.g., thermal, mechanical, electrical, etc.) in the physical object. The use of such simulations can improve the performance of the physical object while also decreasing the cost of the design process because the alternative designs can be tested and evaluated using the computer simulations without manufacturing or fabricating the physical object. FIG. 1 shows an example of a method which can use such computer simulations in the process of designing a physical object. In operation 10, a data processing system, such as a computer, can receive data about a design for a physical object; for example, the data can be a computer aided design (CAD) file that describes the physical object using techniques known in the art. The data can be created in CAD software on a data processing system, and the data can include information about the materials used to fabricate the physical object as well as sizes of different parts of the physical object, the shape of the physical object, etc. Then in operation 12, the data processing system can perform one or more simulations to evaluate the design of the physical object. For example, in one embodiment the simulations can be thermal-mechanical fatigue (TMF) simulations to evaluate how the materials behave under high temperatures and high stress, where the temperatures can fluctuate over time and the stresses can fluctuate over time as a result of the normal operation of the physical object in, for example, a heat exchanger or a turbocharger or a jet engine. Then in operation 14, one or more designers can evaluate the results of the one or more simulations to determine information about the performance and useful product lifetime of the physical object based upon the results from the one or more simulations. Then in operation 16, the designers can determine whether the current design satisfies desired criteria for the physical object. For example, if the simulations show that the product will fail in one year instead of the desired lifetime of three years, the designer will conclude that the criteria has not been satisfied and will revise the design in operation 18 as shown in FIG. 1. On the other hand, if the criteria are satisfied, the designer can conclude the design process and provide data, such as a CAD file, about the physical object to allow the physical object to be fabricated or manufactured in operation 20. If the criteria are not satisfied as determined in operation 16, the designer can revise the design in operation 18 (for example, by changing sizes or shapes of parts in the physical object or changing the composition of material(s) in the object, etc.) and repeat the process by performing additional further simulations to evaluate the redesigned physical object. This can be repeated until the desired criteria are achieved for the physical object, and may require the designer change the design in terms of the materials used, shapes and sizes of components in the physical object, and other parameters that describe how the physical object will be fabricated or otherwise produced.

Figure 2A:
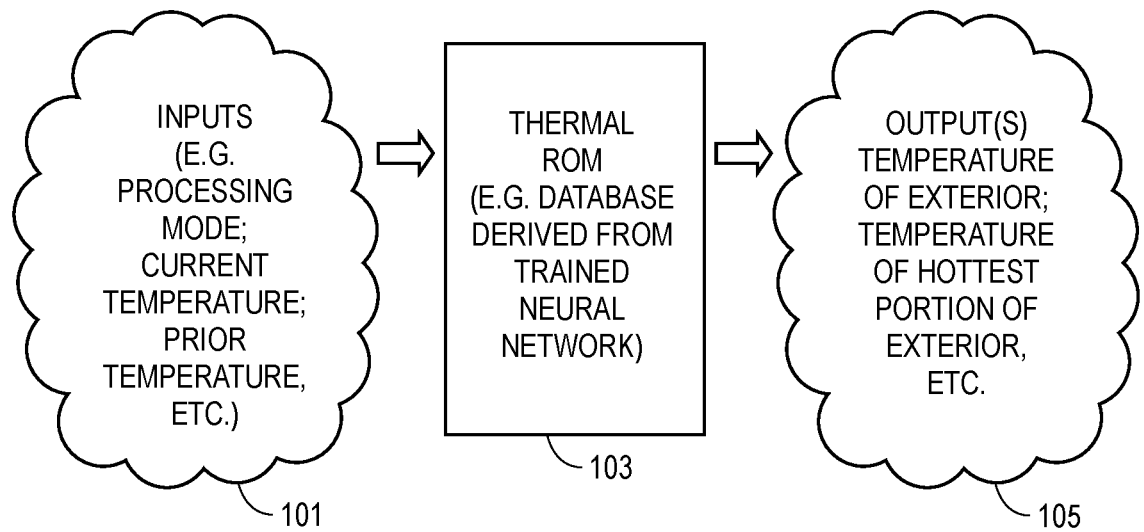
FIG. 2A shows an example of a ROM.

These simulations can use different types of reduced order models (ROMs) for the different models of the physics (e.g., thermal, mechanical, electrical, etc.) being simulated, and the embodiments described herein can combine the different ROMs into a single unit with associated macros to provide a portable file with a standardized interface that can be used by different calling computer programs. FIG. 2A shows an example of a thermal ROM that can be used to model the thermal behavior of an electronic system such as a smartphone that heats up as a result of use of the smartphone. The trained thermal ROM 103 in FIG. 2A can be implemented in a data structure such as a database that stores the trained values for a neural network (such as a convolutional neural network). The thermal ROM can be evaluated by applying the inputs 101 to the thermal ROM to derive a solution in the form of one or more outputs 105. The inputs can provide data about the current simulated processing state and thermal data (such as ambient temperature), and this input data is used to derive a solution from the thermal ROM. Numerous examples for ROMs are known in the art; see, for example, US application publication number 2020/0363856. Generally, a ROM can include a set of data and relationships (e.g., calculations) among the data such that one or more inputs to the ROM produces one or more outputs.

The embodiments described herein can link multiple ROMs, each encapsulated by an associated macro, into an ordered sequence of processing/execution to create a workflow sequence. A macro associated with a particular ROM can receive inputs for the ROM and use these inputs to evaluate the ROM (e.g., by looking up or calculating solutions based on the inputs), and the evaluation of the ROM can produce outputs from the ROM that are further processed by the associated macro which can then provide the processed outputs to the next ROM and its associated macro in the ordered sequence.

Figure 2B:
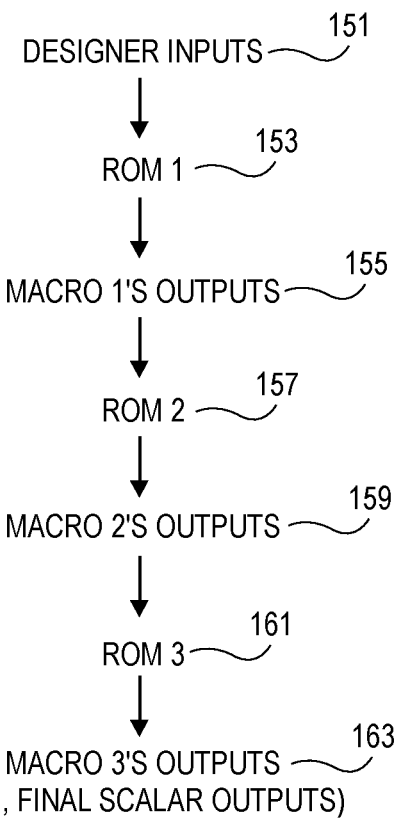
FIG. 2B shows an example of an assembled sequence of macros and ROMs that can be created according to one embodiment.
Figure 3A:
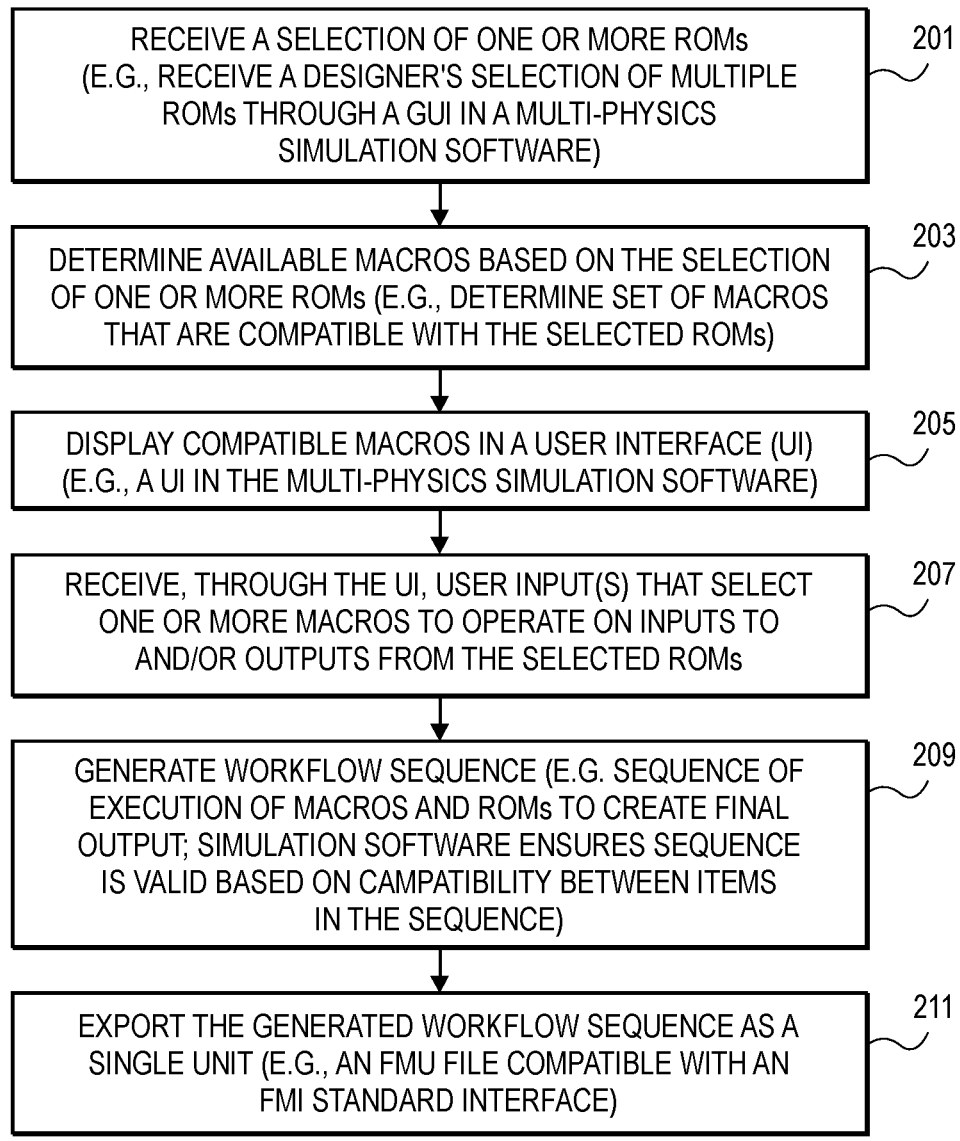
FIG. 3A is a flowchart that shows a method according to one embodiment for creating a workflow sequence.

FIG. 2B shows an example of an ordered sequence of macros that can be created by the one or more embodiments described herein such as the method shown in FIG. 3A. The ordered sequence can begin with user inputs (designer inputs 151) for a particular problem or sequence of simulations. The ordered sequence in FIG. 2B includes three ROMs (ROM 153, ROM 157, and ROM 161) that are each encapsulated by an associated macro; in particular, macro 1 is associated with ROM 1 and receives inputs (e.g., designer inputs 151) for ROM 1 and uses those inputs to evaluate ROM 1 to derive outputs from ROM 1 based on those inputs. Those outputs from ROM 1 are shown as macro 1's outputs 155, and macro 1 may process those outputs before providing them to the next macro in the ordered sequence. The next macro in the ordered sequence in FIG. 2B is macro 2 which is associated with ROM 157; macro 2 receives the outputs 155 from macro 1 and applies data from outputs 155 as inputs to the ROM 157 to derive macro 2's outputs 159 (which may process those outputs before providing them to the next macro in the ordered sequence). The next macro in the ordered sequence in FIG. 2B is macro 3 which is associated with ROM 161; macro 3 receives the outputs 159 from macro 2 and applies data from outputs 159 as inputs to the ROM 161 to derive macro 3's outputs 163 (which may process those outputs before providing them as the final output, which may be scalar values). As described further in this disclosure (e.g., operation 211 in FIG. 3A), the ordered sequence can be encapsulated into a single unit such as a standardized FMU file.

A method for creating an ordered sequence or workflow sequence according to one embodiment will now be described while referring to FIG. 3A. This method can be performed on a simulation system such as a data processing system that is executing simulation software, such as a multi-physics simulation software. The method can begin when the designer creates a set of ROMs or loads the set of ROMs if they have already been created in the simulation system. In operation 201, a designer can then select one or more of the ROMs to create a workflow sequence with macros; one embodiment, the selection may occur as a result of loading existing ROMs in a process for creating a workflow sequence. In one embodiment, a designer's selection of the one or more ROMs can be an input that is received by a simulation system. In the case of the example shown in FIG. 2B, the designer selected ROM 1, ROM 2 and ROM 3 for inclusion into the workflow sequence. Then in step 203, the simulation system can determine what available macros are compatible with the ROMs that were selected in operation 201. The macros may be existing macros that are provided in the simulation system or custom macros created by the designer.

The simulation system determines compatibility between the macros and the ROMs and also between the macros themselves in order to ensure that the calculations performed by the macros and the ROMs are compatible with each other. The ROMs will have inputs and outputs that are in certain units (e.g., pressure, loads, etc.) and certain datatypes (e.g., floating point), and the macros will also have inputs and outputs that are in certain units and in certain datatypes, and the simulation system in operation 203 verifies compatibility among the ROMs and the macros such that an ordered sequence can be properly created and will function; operation 203 can use macro selection logic to ensure no incompatible macros are combined in a sequence. The macro selection logic enforces this compatibility in one embodiment through a user interface that will be described below; the user interface limits the user's ability to select macros to only those that are compatible with the workflow sequence that is being created. Not all sequences of macros will work or produce useful output. If a first macro in a sequence provides outputs in the same units and data types as the inputs to a second macro in the sequence, then the two macros (where the first macro generates outputs that are used as inputs to the second macro) should be compatible; on the other hand, if the units or data types are different at an interface between successive macros, then they will not be compatible (absent a conversion in units or data types).

FIG. 3B shows an example of how a simulation system can perform operation 203 by matching the compatibility of macros with ROMs. FIG. 3B can represent the result of this matching in a table 251 which may be stored in a simulation system. Alternatively, the simulation system may rely upon a comparison "on the fly" of the units and datatypes between the ROMs and the macros to match compatible macros with each ROM. In the example shown in FIG. 3B, ROM 1 is compatible with macros 1, 3, and 5, and ROM 2 is compatible with macros 2 and 4, ROM 3 is compatible with macros 1 and 5. Compatibility between successive macros in a sequence can also be verified based upon units and datatypes. FIG. 3C shows an example of a macro which includes three input values 261 and three output values 263, each of which are expressed in certain units, such as pressure or temperature or a load value, etc. and each of which has a certain datatype, such as integer, floating-point, Boolean, etc. In one embodiment, a macro can be similar to a scripting code of any length and complexity and can take inputs and also return outputs of defined types. In one embodiment, the macro can read inputs from a database and write outputs to the database. In one embodiment, the macro can be written in a script code, such as the Python language. In one embodiment, each macro can read and write data objects from and to a database using a database identifier input/output types. In one embodiment, macros with the field data object identifier as an input type require the previous macro write the field data object to the database. In one embodiment, field data objects should be first created and written to a database by a macro without field input parameters in order to have the ability to export a completed workflow sequence as an FMU 2.0 file. In one embodiment, the macros may perform simple analyses, such as extracting a maximum or minimum or mean value along the edge or other spatial sub-region of the simulated physical object, or may perform postprocessing operations (such as the calculation of vector norms, von Mises stress from tensors, etc.), or may perform statistical analysis, such as statistical analysis for robustness, reliability or fatigue, or may combine the output of multiple ROMs or may project an output of a ROM into a compressed subspace for system simulation, etc.

Figure 5A:
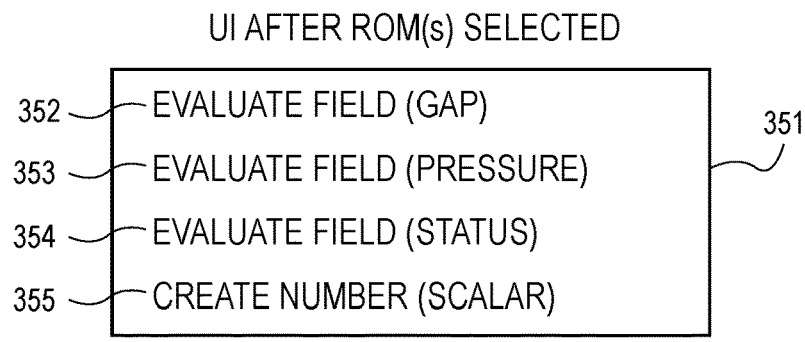
FIGS. 5A, 5B, and 5C show examples of a sequence of user interfaces in a simulation system according to one embodiment.
Figure 5B:
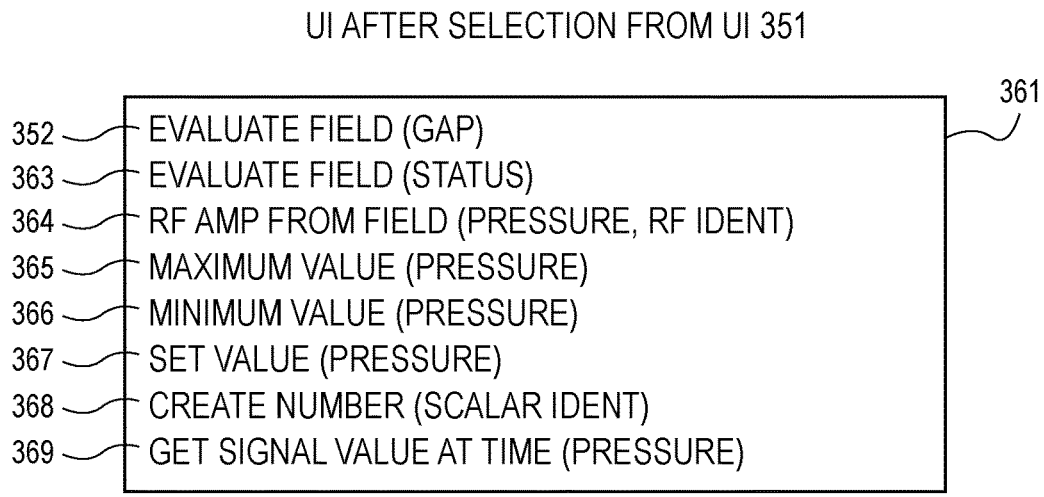
Figure 5C:
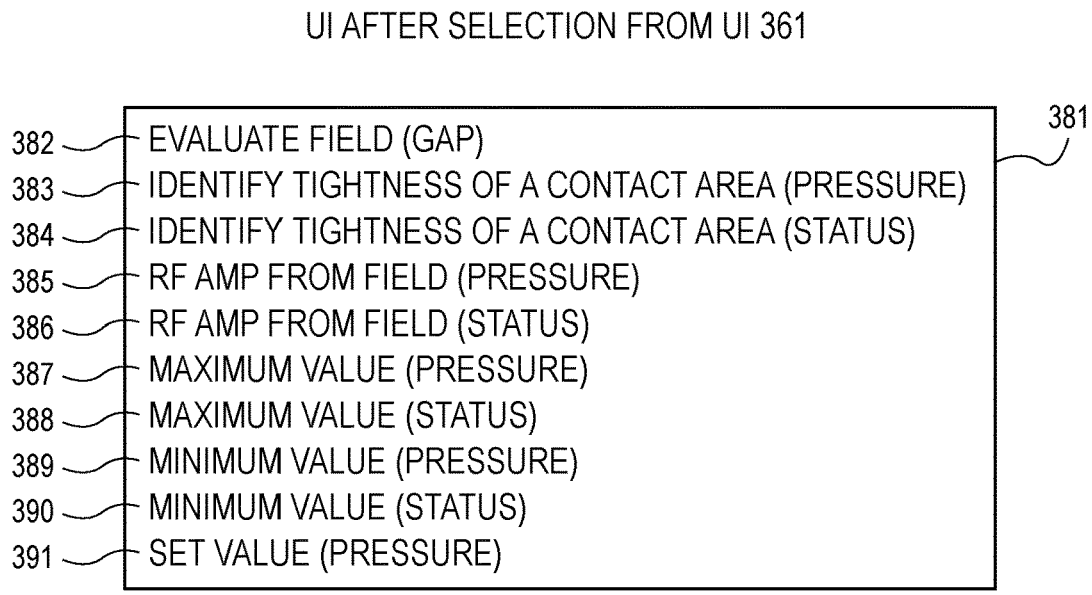

Referring back to FIG. 3A, once the simulation system has performed operation 203 and has a list of available and compatible macros for the selected ROMs, it can then perform operation 205. In operation 205, the simulation system can display a list of compatible macros in a user interface of the simulation system. In one embodiment, the simulation system may be executing a multi-physics simulation software that displays a list of compatible macros in a user interface such as the user interface 351 shown in FIG. 5A. The list of compatible macros in the user interface 351 is restricted based on compatibility so that only those macros which are compatible with the selected ROMs (selected in operation 201) are listed and available for selection by the user in the user interface 351. The user interface 351 shows four compatible macros 352, 353, 354, and 355. In this example, it is assumed that the user will select the macro 353 in operation 207 of FIG. 3A. Operation 207 can be repeated multiple times as the user selects one or more macros to operate on the inputs and outputs from each of the selected ROMs. The selection of a macro in operation 207 is also in effect a selection of a particular ROM in those many cases in which the selected macro is associated with or encapsulates a particular ROM. Referring back to FIG. 2B, the designer during the creation of the workflow sequence shown in FIG. 2B would first select the macro designated as macro 1 and then select the macro designated as macro 2 and then select the macro designated as macro 3 to specify the order or sequence of calculations. This would then specify the ordered sequence of the processing through the macros and the associated ROMs as shown in FIG. 2B. As a designer or user selects one macro after another macro, thereby also selecting associated or encapsulated ROMs, the user interface changes to reflect the available macros and their associated ROMs based upon the prior selections in the workflow sequence. Referring back to FIGS. 5A, 5B, and 5C, after the designer selects the macro 353 from the user interface 351, the user interface transitions to the user interface 361 shown in FIG. 5B (showing macros 362, 363, 364, 365, 366, 367, 368, and 369), and the user then selects macro 363 from the user interface 361 to produce the user interface 381 (showing macros 382, 383, 384, 385, 386, 387, 388, 389, 390, and 391) shown in FIG. 5C. Thus, in one embodiment, the user interface as shown in FIGS. 5A, 5B, and 5C can be the user interface that is displayed to the user during operation 207 in FIG. 3A as a user creates in time the workflow sequence in a particular order. In each case, the user interface, such as the user interface 361 and the user interface 381 restricts the displayed list of available macros to only those macros that are compatible with the current state of the workflow sequence.

Once the user has completed selection of macros and any associated ROMs, the simulation system in operation 209 can generate the workflow sequence which can be a sequence of execution of macros and ROMs to create the final output. In one embodiment the simulation software ensures that the sequence is valid based on the compatibility between the macros in the sequence as described above. The simulation system can ensure the sequence is valid in in one embodiment by ensuring that there is compatibility between successive macros (at the interface from an output of a first macro and the input to the next macro in the sequence after the first macro).

After the workflow sequence has been generated in operation 209, the simulation system can then export the generated workflow sequence as a single unit. In one embodiment, this single unit can be an FMU file that is compatible with the FMI standard (see fmi-standard.org). The exported file can then be opened by other computer programs to perform the one or more simulations contained within the workflow sequence. As is known in the art, a functional mockup interface (FMI) defines a container and an interface to exchange dynamic models using, in one embodiment, a combination of XML files, binaries and source code zipped (compressed and combined) into a single file. FIG. 4A shows an example of an FMU file 301 that contains a plurality of ROMs 303 and a plurality of macros 305. The FMU file 301 can be exported by the simulation system and then used by other computer software to run the simulations embodied in the FMU file 301. FIG. 4B shows another representation of an FMU file 311 in that it shows the different types of items contained in the zipped file; for example, the FMU file 311 can include one or more XML files 312, one or more binary code files 314, and one or more source code files 317. Using the standardized interface defined by the standard in one embodiment, many different computer programs can use the encapsulated workflow sequence in the FMU file by executing the workflow sequence.

Figure 6A:
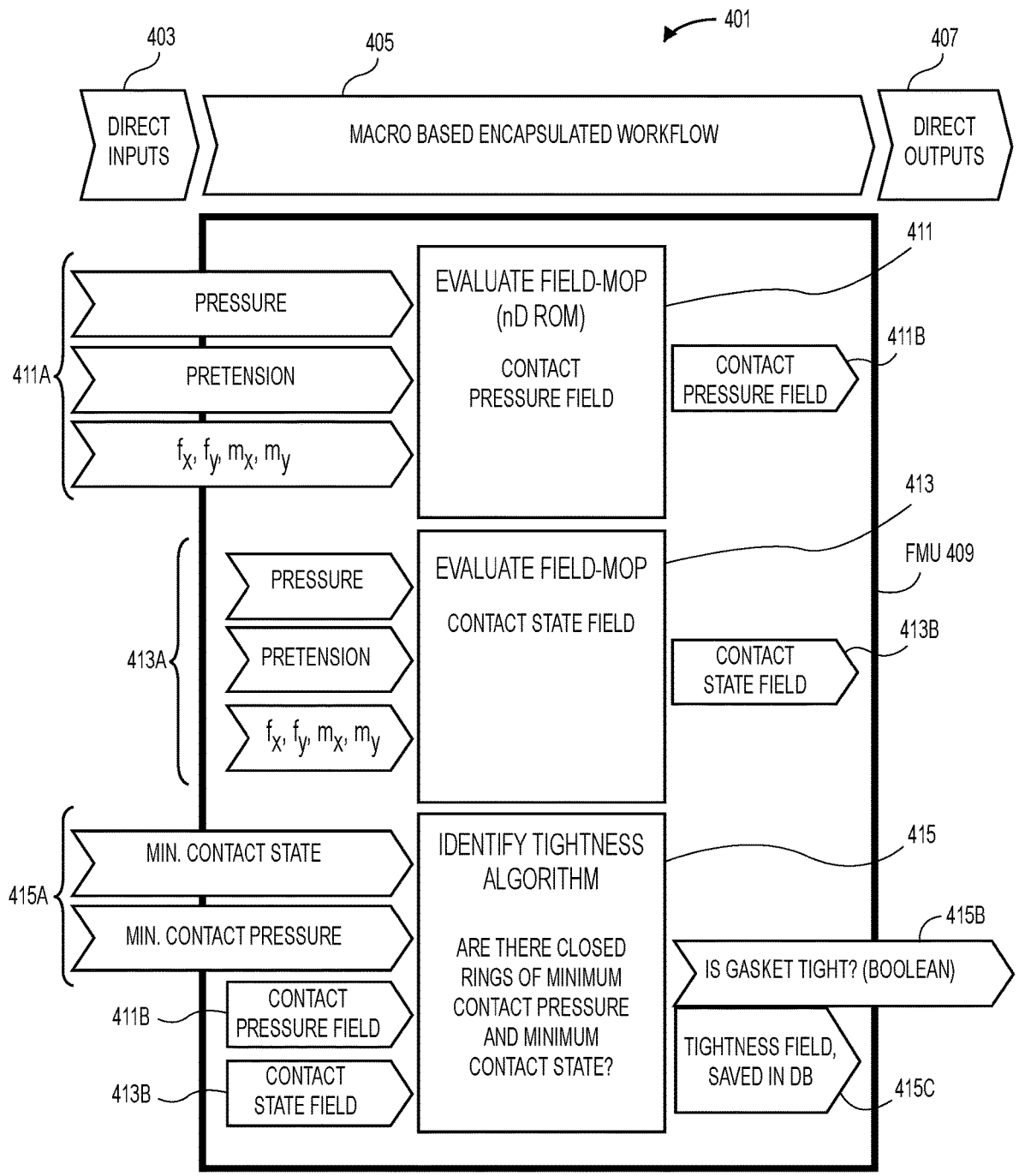
FIGS. 6A, 6B, and 6C show examples of FMU files created according to the one or more embodiments described herein.
Figure 6B:
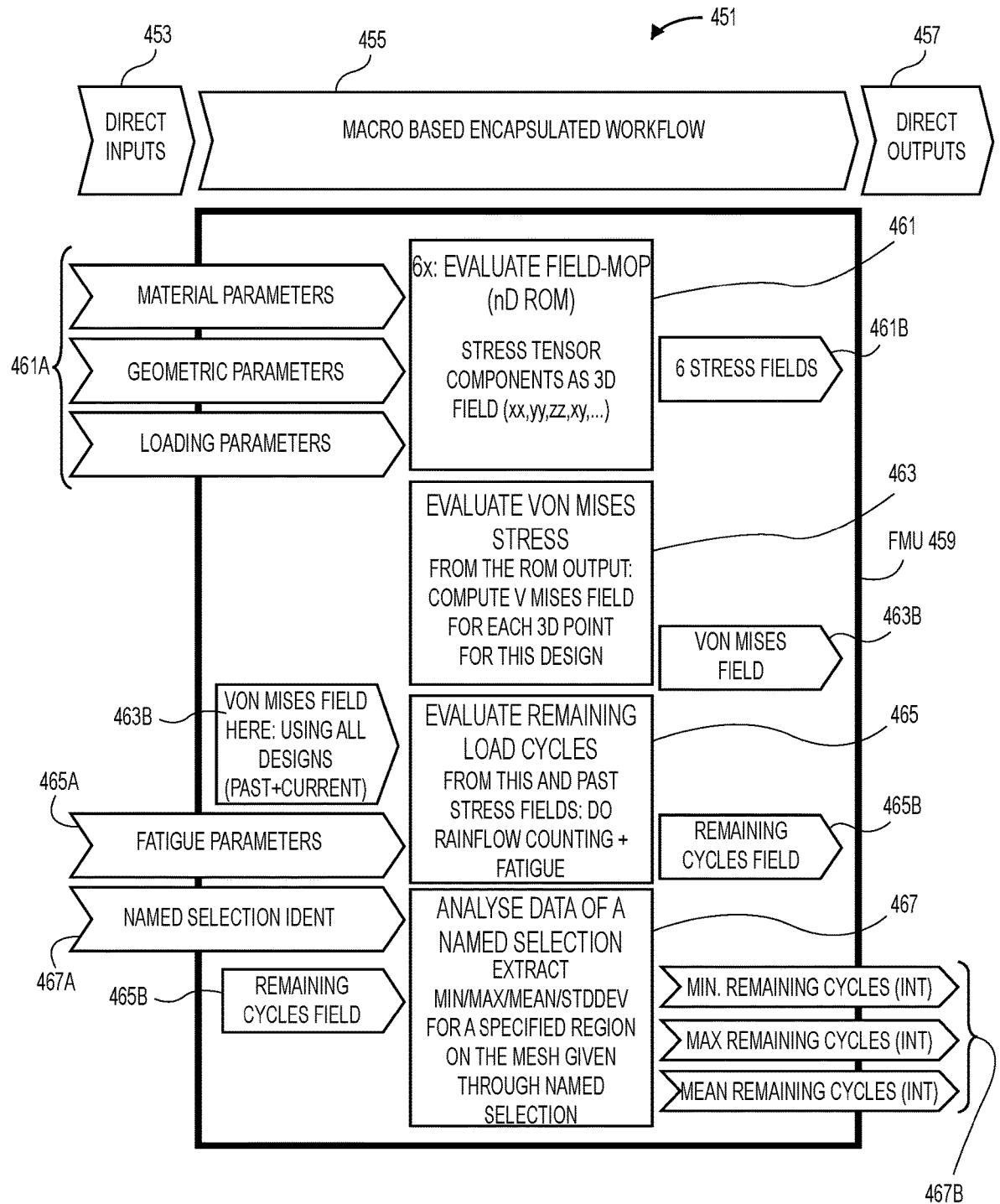
Figure 6C:
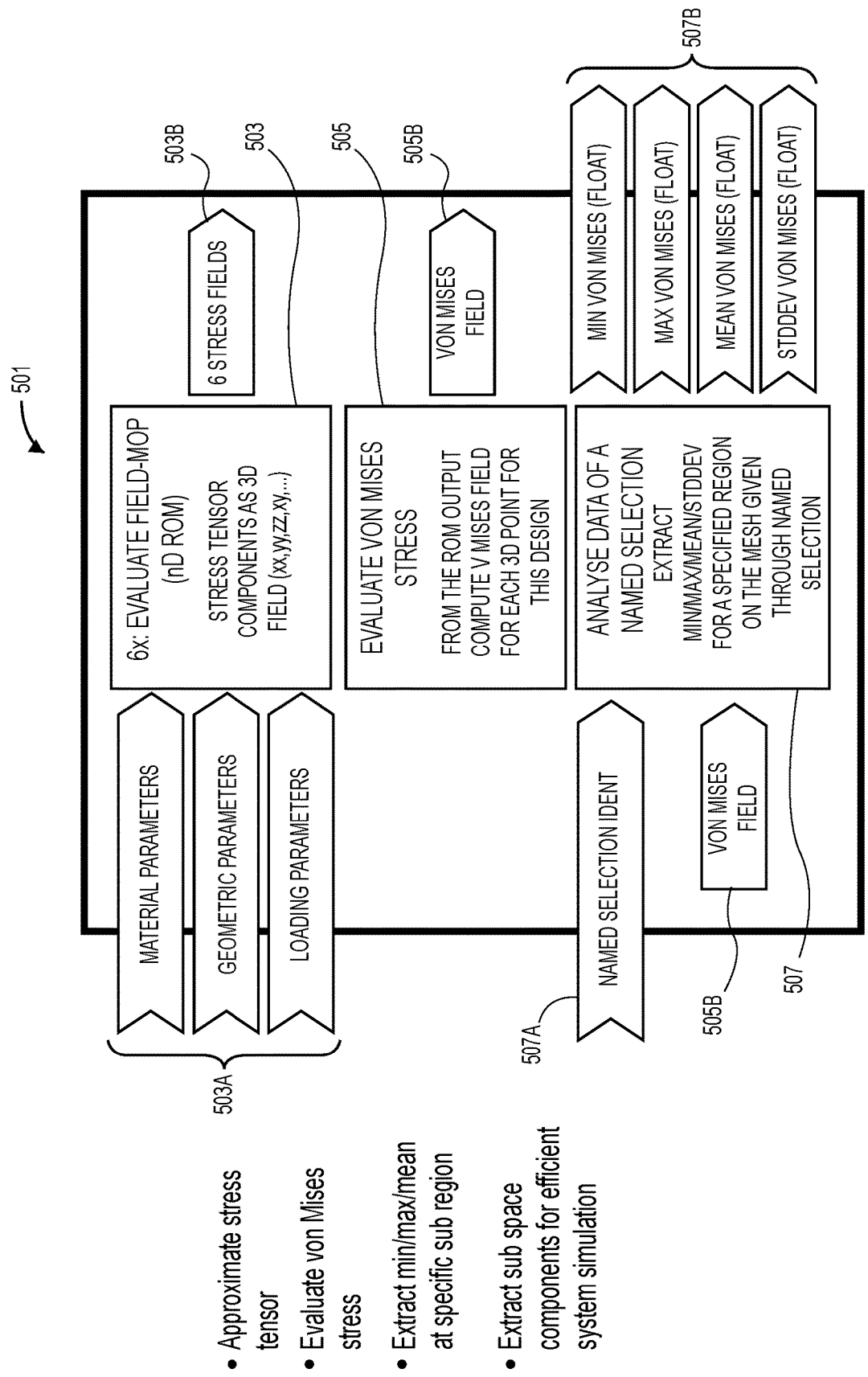

FIGS. 6A, 6B, and 6C show three examples of completed workflow sequences encapsulated within FMU files. These three examples can be created using the method shown in FIG. 3A in a simulation system executing a multi-physics simulation software. In the example shown in FIG. 6A, a macro based encapsulated workflow 401 is instantiated in an FMU file 409 that receives a set of inputs 403 and provides a set of outputs 407 through a workflow 405. The FMU file 409 includes three macros (macros 411, 413 and 415) and two ROMs (one encapsulated within macro 411 and the other encapsulated with macro 413). The macro 411 receives inputs 411A and provides an output 411B derived from the ROM encapsulated in the macro 411. The macro 413 receives inputs 413A and provides an output 413B derived from the ROM encapsulated within the macro 413. The macro 415 receives inputs 411B, 413B and 415A and provides an output 415B and an output 415C.

Figure 7:
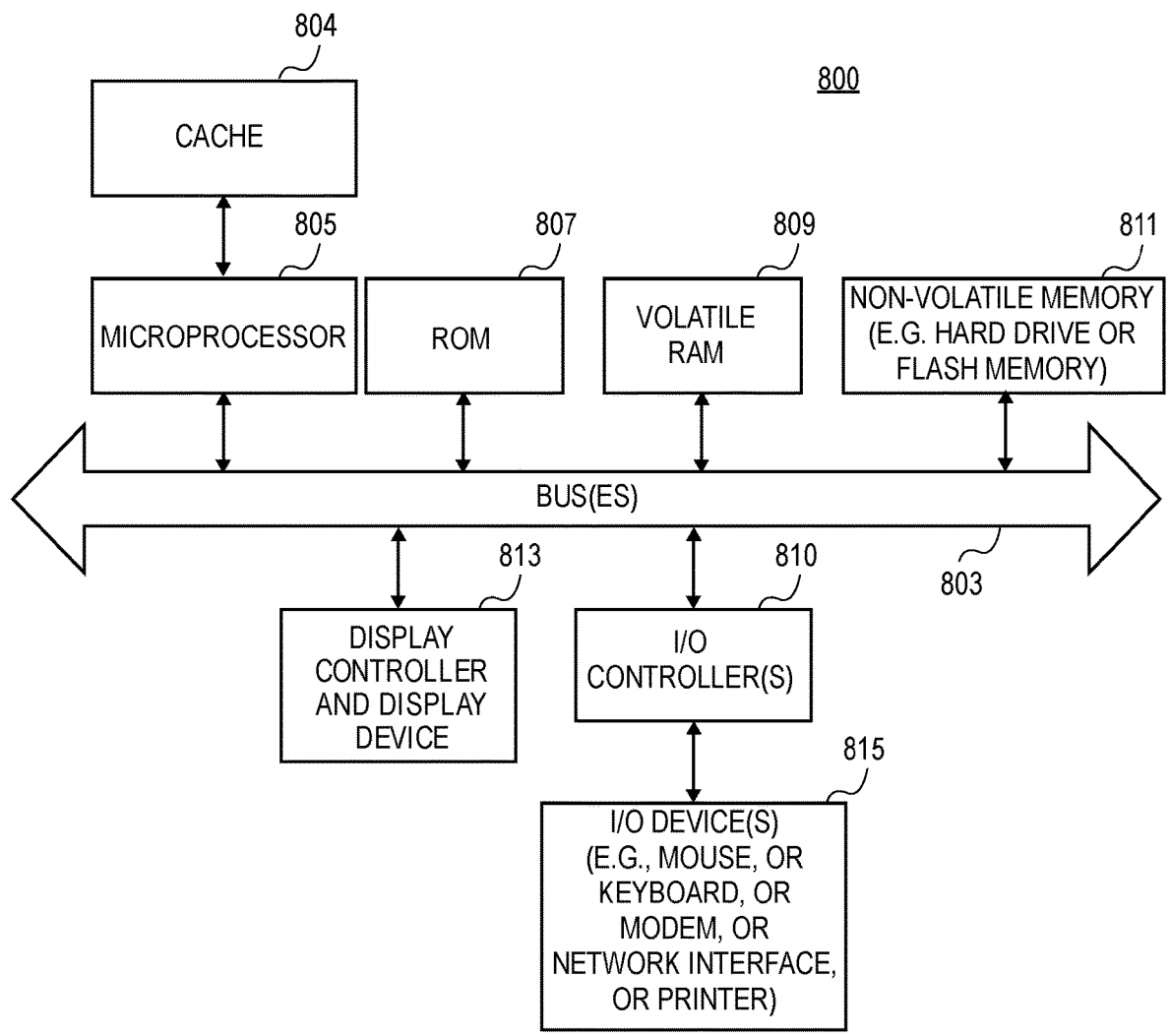
FIG. 7 shows an example of a data processing system, such as a simulation system, that can be used to implement one or more embodiments described herein.

FIG. 7 shows one example of a data processing system 800, which may be used with one or more embodiments described herein. For example, the system 800 may be implemented to provide a simulation system or device that performs any embodiment described herein such as the method of FIG. 3A. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM Read Only Memory 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, compact disk read only memories, digital video disk read only memories, erasable programmable read only memory, electronically erasable programmable read only memory, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions that when executed by a data processing system cause the data processing system to perform a method, the method comprising:
   receiving a selection of a set of two or more reduced order models (ROMs);
   determining a set of one or more macros corresponding to the selected set of two or more ROMs, based on units and datatypes associated with the selected set of two or more ROMS;
   displaying in a user interface the determined set of one or more macros;

receiving user inputs that select one or more macros, from the determined set of one or more macros, to operate with the selected set of two or more ROMs;

generating a workflow sequence comprising an ordered sequence for execution of the selected set of the two or more ROMs, each of the selected set of the two or more ROMs encapsulated by an associated macro from the selected one or more macros in the workflow sequence; and executing the selected one or more macros that encapsulate the selected set of the two or more ROMs of the workflow sequence to simulate a physical system to facilitate design of the physical system, wherein the selected set of two or more ROMs are executed using the selected one or more macros to simulate separate models of the physical system, and wherein the selected one or more macros are executed to operate on inputs and outputs of the selected set of the two or more ROMs.

2. The non-transitory machine readable medium as in claim 1, wherein the user interface is displayed by a multi-physics simulation software that is executing on the data processing system, and wherein the method further comprises:

saving the workflow sequence as a single unit in a format.

3. The non-transitory machine readable medium as in claim 2, wherein the single unit is a computer file in a standardized format specified by a file name extension.

4. The non-transitory machine readable medium as in claim 3, wherein the selected one or more macros comprises at least two or more macros, and the single unit encapsulates the selected one or more macros and the selected set of two or more ROMs.

5. The non-transitory machine readable medium as in claim 4, wherein the user interface displays only the determined set of one or more macros, and wherein the method further comprises verifying the generated workflow sequence.

6. The non-transitory machine readable medium as in claim 5, wherein the determining of the set of the one or more macros is based at least in part on a matching of data fields and data types in the outputs from the selected two or more ROMs and macro inputs from the selected one or more macros from the determined set of one or more macros.

7. The non-transitory machine readable medium as in claim 6, wherein each ROM in the set of two or more ROMs comprises a set of predetermined data and relationships among the predetermined data such that one or more of the inputs to a ROM in the set of two or more ROMs produces one or more of the outputs from the ROM in the set of two or more ROMs;

and wherein each macro in the selected macros comprises instructions that represent a set of calculations for predetermined data input types and predetermined data output types.

8. The non-transitory machine readable medium as in claim 7, wherein each of the associated macros in the selected macros receives a set of one or more macro inputs and uses the set of the one or more macro inputs to evaluate an associated ROM in the set of ROMs in order to receive the produced one or more of the outputs from the associated ROM and then processes the produced one or more of the outputs from the associated ROM to produce a scalar output.

9. The non-transitory machine readable medium as in claim 8, wherein the selected set of the two or more ROMs provide a set of simulations of the physical system to facilitate design of the physical system.

10. The non-transitory machine readable medium as in claim 9, the method further comprising:

iteratively performing the set of simulations with the single unit.

11. A method performed by a data processing system, the method comprising:

receiving a selection of a set of two or more reduced order models (ROMs);

determining a set of one or more macros corresponding to the selected set of two or more ROMs, based on units and datatypes associated with the selected set of two or more ROMS;

displaying in a user interface the determined set of one or more macros;

receiving user inputs that select one or more macros, from the determined set of one or more macros, to operate with the selected set of two or more ROMs;

generating a workflow sequence comprising an ordered sequence for execution of the selected set of the two or more ROMs, each of the selected set of the two or more ROMs encapsulated by an associated macro from the selected one or more macros in the workflow sequence; and executing the selected one or more macros that encapsulate the selected set of the two or more ROMs of the workflow sequence to simulate a physical system to facilitate design of the physical system, wherein the selected set of two or more ROMs are executed using the selected one or more macros to simulate separate models of the physical system, and wherein the selected one or more macros are executed to operate on inputs and outputs of the selected set of the two or more ROMs.

12. The method as in claim 11, wherein the user interface is displayed by a multi-physics simulation software that is executing on the data processing system, and wherein the method further comprises:

saving the workflow sequence as a single unit in a format.

13. The method as in claim 12, wherein the single unit is a computer file in a standardized format specified by a file name extension.

14. The method as in claim 13, wherein the selected one or more macros comprises at least two or more macros, and the single unit encapsulates the selected one or more macros and the selected set of two or more ROMs.

15. The method as in claim 14, wherein the user interface displays only the determined set of one or more macros, and wherein the method further comprises verifying the generated workflow sequence.

16. The method as in claim 15, wherein the determining of the set of the one or more macros is based at least in part on a matching of data fields and data types in the outputs from the selected two or more ROMs and macro inputs from the selected one or more macros from the determined set of one or more macros.

17. The method as in claim 16, wherein each ROM in the set of two or more ROMs comprises a set of predetermined data and relationships among the predetermined data such that one or more of the inputs to a ROM in the set of two or more ROMs produces one or more of the outputs from the ROM in the set of two or more ROMs;

and wherein each macro in the selected macros comprises instructions that represent a set of calculations for predetermined data input types and predetermined data output types.

18. The method as in claim 17, wherein each of the associated macros in the selected macros receives a set of one or more macro inputs and uses the set of the one or more macro inputs to evaluate an associated ROM in the set of ROMs in order to receive the produced one or more of the outputs from the associated ROM and then processes the produced one or more of the outputs from the associated ROM to produce a scalar output.

19. The method as in claim 18, wherein the selected set of the two or more ROMs provide a set of simulations of the physical system to facilitate design of the physical system.

20. The method as in claim 19, the method further comprising:
  iteratively performing the set of simulations with the single unit.

* * * * *